Figure 1:
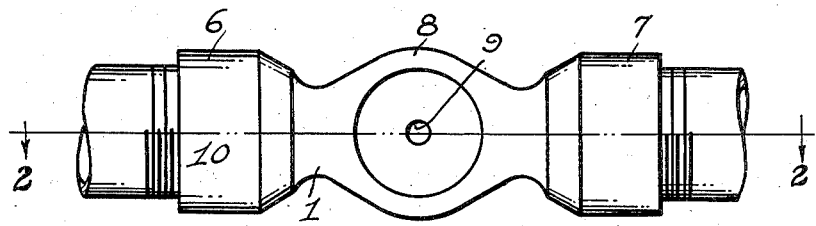

May 3, 1938.　　A. E. HOHMEISTER　　2,115,953
ADJUSTABLE RAILING FITTING
Filed Feb. 26, 1936　　3 Sheets-Sheet 1

INVENTOR.
ARTHUR E. HOHMEISTER
BY
Leo H. Parker
ATTORNEY.

May 3, 1938.  A. E. HOHMEISTER  2,115,953

ADJUSTABLE RAILING FITTING

Filed Feb. 26, 1936  3 Sheets-Sheet 2

INVENTOR.
ARTHUR E. HOHMEISTER
BY
Leo N. Parker
ATTORNEY.

INVENTOR.
ARTHUR E. HOHMEISTER
BY
ATTORNEY.

Patented May 3, 1938

2,115,953

UNITED STATES PATENT OFFICE 2,115,953

ADJUSTABLE RAILING FITTING

Arthur E. Hohmeister, Cincinnati, Ohio, assignor of one-half to James C. Denier, Cincinnati, Ohio Application February 26, 1936, Serial No. 65,795

4 Claims. (Cl. 287—14)

The invention relates to adjustable and interchangeable parts or couplings particularly adapted for use in forming railing fittings.

Heretofore, considerable difficulty, expense and inconvenience has been experienced by plumbers, contractors, and other constructors and builders, who desire to assemble various available parts for the purpose of constructing and installing railings for different purposes.

Generally speaking, it is necessary that sellers and dealers stock a great amount of parts or couplings in order to be able to supply users with the required parts capable of being utilized to construct railings of the desired forms and shapes. This is readily apparent when it is considered that almost every conceivable angle exists between the pipe ends which must be substantially and securely fastened together.

Therefore, an important object of applicant's invention is to provide simple, efficient, practical and desirable means which may be manually utilized to quickly, conveniently and securely fasten together the ends of pipes, rods, and the like, when said pipes, rods, and the like, extend at any angle with respect to each other.

Other objects of the invention are to provide durable means to fasten together the ends of pipes, rods, and the like, said means comprising a plurality of interchangeable parts movable at different angles with respect to one another whereby, irrespective of the angle at which said pipes, rods, and the like, extend, said parts may be manually assembled and adjusted to form various fittings, such as elbows, T's, crosses, and the like, to accommodate the desired angle; and to provide simple and effectual means which will enable a user to quickly and efficiently assemble, adjust and secure said pipes, rods, and the like.

The invention consists in the combination and arrangement of the parts as described, illustrated and claimed.

Figure 2:
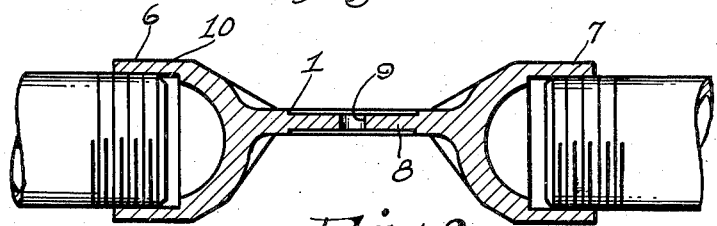
Figures 3, 4:
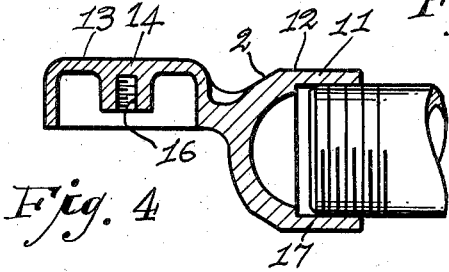
Figure 7:
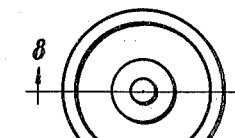
Figure 8:
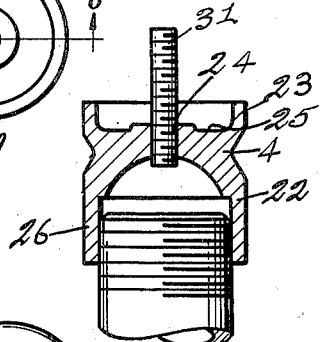
Figure 5:
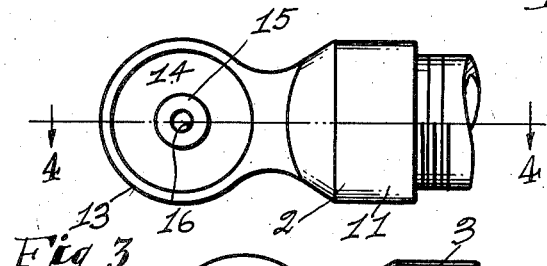
Figure 9:
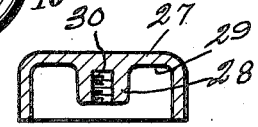
Figure 10:
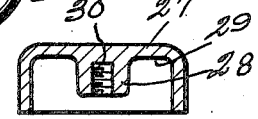
Figure 6:
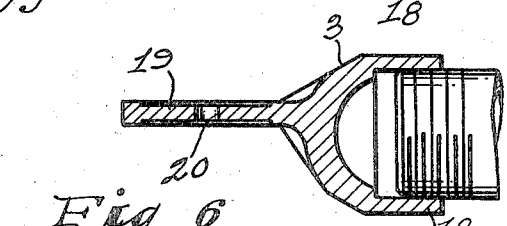
Figure 11:
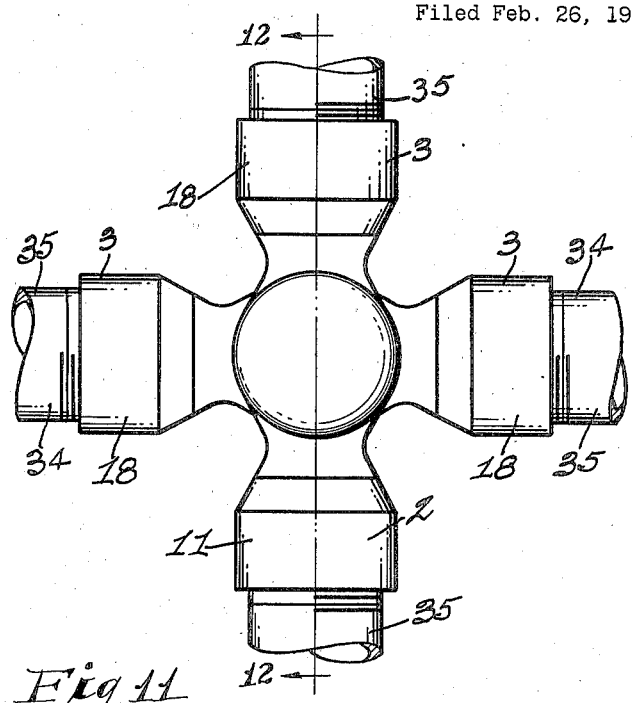
Figure 12:
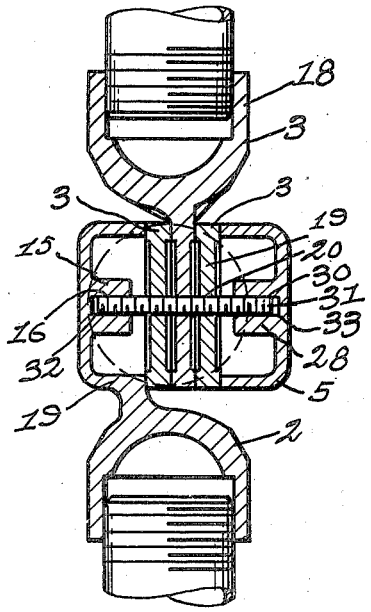
Figure 13:
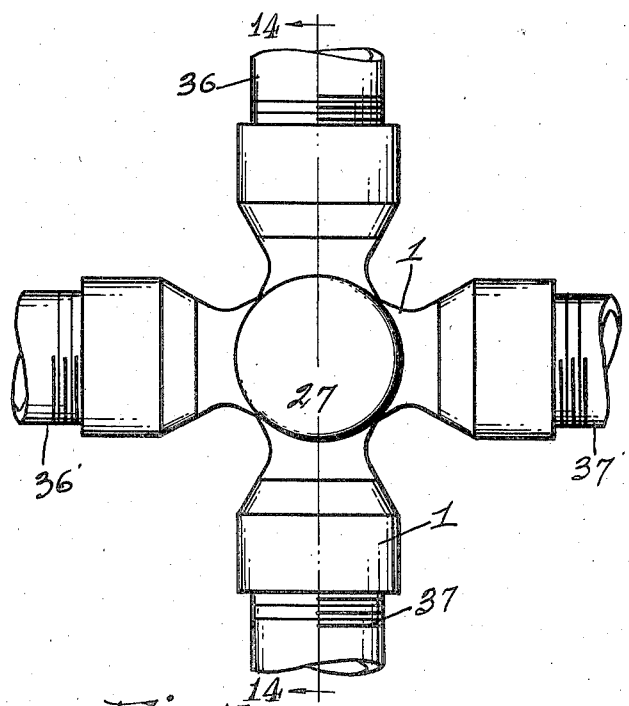
Figure 14:
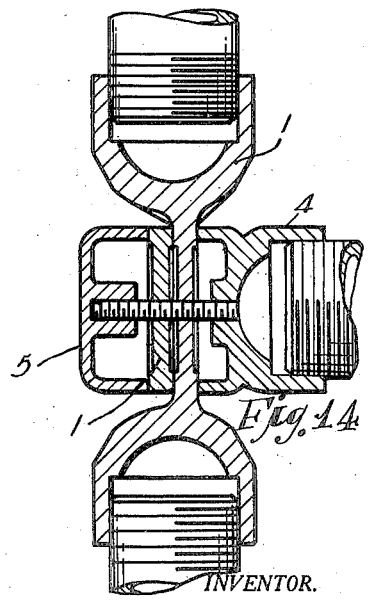
Figure 15:
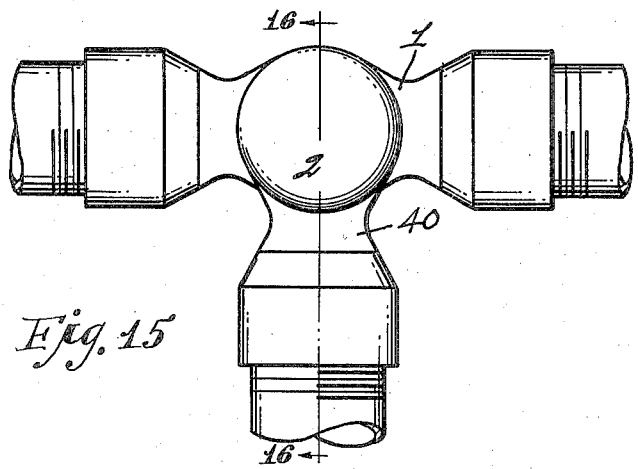
Figure 16:
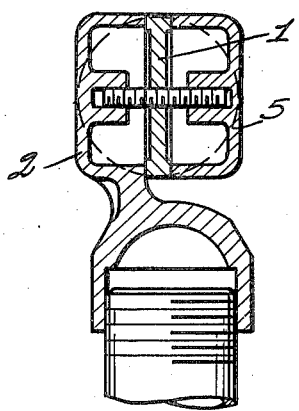
Figure 17:
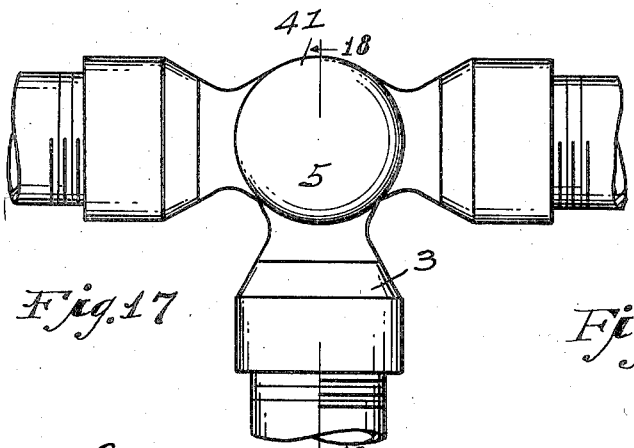
Figure 18:
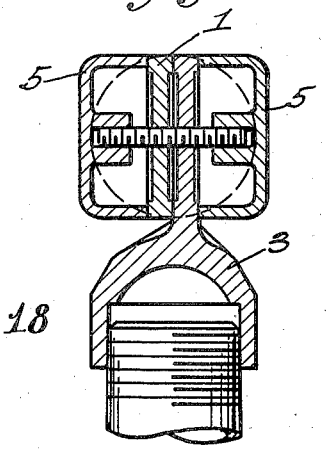
Figure 19:
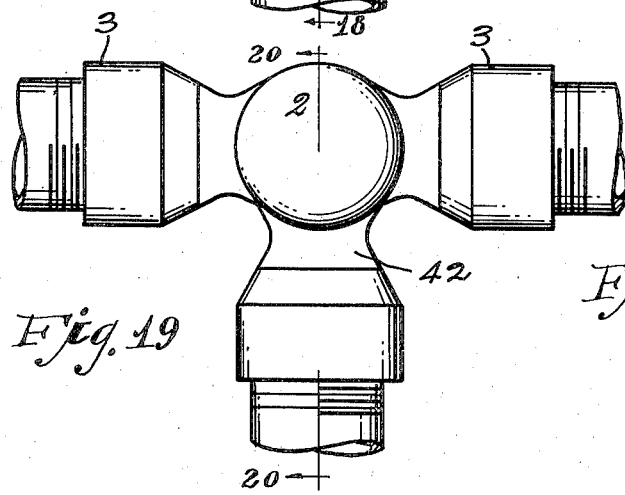
Figure 20:
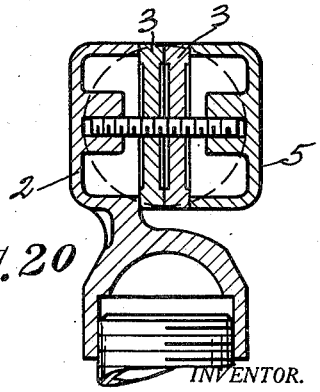

In the drawings:

Fig. 1 is a plan elevation of a coupling;
Fig. 2 is a section on line 2—2 in Fig. 1;
Fig. 3 is a side elevational view of a coupling;
Fig. 4 is a section on line 4—4 of Fig. 3;
Fig. 5 is a side elevational view of a coupling;
Fig. 6 is a section on line 6—6 in Fig. 5;
Fig. 7 is an end elevational view of a coupling;
Fig. 8 is a section on line 8—8 in Fig. 7;
Fig. 9 is an end elevational view of a coupling;
Fig. 10 is a section on line 10—10 in Fig. 9;
Fig. 11 is a plan elevational view of a fitting;
Fig. 12 is a section on line 12—12 in Fig. 11;
Fig. 13 is a plan elevational view of a coupling;
Fig. 14 is a section on line 14—14 in Fig. 13;
Fig. 15 is a plan elevational view of a fitting;
Fig. 16 is a section taken on line 16—16 in Fig. 15;
Fig. 17 is a plan elevational view of a fitting;
Fig. 18 is a section taken on a line corresponding to line 18—18 in Fig. 17;
Fig. 19 is a plan elevational view of a fitting;
Fig. 20 is a section taken on a line corresponding to line 20—20 in Fig. 19.

In the preferred construction of the invention I provide five differently constructed couplings 1, 2, 3, 4, 5.

The coupling 1 consists of the oppositely disposed and internally threaded mouths or bells 6 and 7, having their inner ends integrally connected with the disc 8 having therein the centrally disposed hole 9. The disc is in parallel relation to the side walls 10 of the mouth or bells.

The opposite faces of the flange or disk portion 8 are flat, and one of said faces is coplanar with the center line or longitudinal axis of the socket or bell portions 6 and 7.

The coupling 2 consists of the internally threaded mouth or bell 11 having integrally connected with its inner end, and adjacent its side 12 the cup or cap 13 having integrally connected with its bottom 14 the centrally disposed and inwardly extending boss 15 through which is the hole 16 in which is internal threads. The bottom 14 of the cup is parallel with the side walls 17 of the bell. The top or circumferential edge of the cup or cap 13, adapted to contact the disk or web portions 8 of coupling 1, as shown in Fig. 14, is flat and so related or offset relative to the center line or longitudinal axis of the bell or socket portion 11 of the coupling 2, that the said center line or axis is coplanar with the center line or longitudinal axis of the coupling 1, when assembled therewith, as shown in Fig. 14. In other words, the said edge of cap 13 is spaced from the indicated center line, a distance approximately equal to the thickness of the web or disk 8.

The coupling 3 consists of the internally threaded mouth or bell 18 having integrally connected with its inner end the disc 19 having the centrally disposed hole 20 therein. The disc extends parallel with the side walls 21 of the bell.

The coupling 3 is substantially a half of the coupling 1. The lug or disk 19 bears the same relation to the single socket or bell portion 18 of coupling 3, that the web or disk 8 bears to either of the sockets 7 of coupling 1. Likewise, the offset and thickness of disk 19 of coupling 3 corresponds to the thickness and offset of web or disk 8 to either socket of coupling 1.

The coupling 4 consists of the mouth or bell 22 having integrally connected with its inner end the cup or cap 23 having the centrally disposed hole 24 therein. The bottom 25 of the cup 23 extends at right angles to the side walls 26 of the mouth or bell 22.

The coupling 5 consists of the cup 27 having the boss 28 integrally connected with its bottom 29. The boss 28 is centrally disposed of the bottom and extends inwardly of the cup. In the boss 28 is the hole 30 in which is internal threads.

Any kind of T, elbow, or cross may be constructed from the couplings 1, 2, 3, 4, 5, and with the mouths or bells as will be hereinafter explained.

When assembling a cross adjustable for all angles, as shown in Fig. 11, three couplings 3 are arranged with their discs 19 adjacent each other and with the holes 20 in alignment. Then the coupling 2 is arranged with the boss 15 adjoining the outer surface of the outer discs 19, of the coupling 3, and with the hole 16 in alignment with the holes 20. Then the bolt 31 is passed through the holes 16 and 20 in the boss 15 and the discs 19, and the end 32, of the bolt 31, is screwed into the hole 16 in the boss 15, of the coupling 2. Then the other end 33 of the bolt 31 is screwed into the hole 30, in the boss 28, of the coupling 5, as by rotating the coupling 5 with respect to the bolt 31. The mouths 18 of the couplings 3, and the mouth 11, of the coupling 2, may be manually moved into any relative position (as by rotating cup 13 and the discs 19, on the bolt 31) for the purpose of positioning the mouths 11 and 18 in alignment with the ends 34 of the pipes 35 to which the mouths are attached, as by screwing the ends 34 of the pipes into the respective mouths.

If the two pipes 36, 37 and 36', 37', as shown in Figs. 13 and 14, to be connected are in longitudinal alignment with each other, the couplings shown in Fig. 11, may be substituted by the couplings 1 whose holes 9 in the discs 8 receives the bolt 31 and the cups 27 of the two couplings 5 may contact the oppositely disposed sides of the discs 1. As by manually rotating either of the coupling 1, the mouths 6 and 7 may be positioned at any desired angles with respect to the mouths 6 and 7, of the other coupling 1.

In order that the outer surfaces of the cups 13 and 27, of the couplings 2 and 5, shall have no bolt protruding therefrom the coupling 5 should be attached on one side of the cross, T or elbow which is formed from the couplings 1, 2, and 3 whereby, after the bolt 31 is protruded through holes 9, or 20 in the couplings 1 and 3, (when these couplings are used) the one end of the bolt may be screwed into the hole 16, of the boss 15, of the coupling 2, and coupling 5 may be manually screwed onto the other end of the bolt.

If a T 40 is desired to be formed it may comprise the couplings 1, 2 and 5, as shown in Figs. 15 and 16, or the T 41 may comprise the couplings 1 and 3 and 5, as shown in Figs. 17 and 18, or the two couplings 3, and the couplings 2 and 5, as shown in Figs. 19 and 20, may form the T 42.

It is quite apparent that numerous and many different kinds of T's, crosses and elbows may be formed by combining the couplings 1, 2, 3, 4, and 5. In fact irrespective of the form of the rail fittings required it may be formed from some combination of the couplings, in combination with the bolt 31.

For the reason that various and many different crosses, T's, and elbows may be formed by use of the couplings, a great reduction in stock of any dealer will result by use of the invention, because by use of five different couplings any number of crosses, T's and elbows with their mouths extending in different directions, may be formed.

It is, therefore, quite apparent that I have invented a highly desirable device for the intended purposes which may be utilized for quickly and securely connecting the ends of pipes which extend at different angles.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. In a device of the class described, the combination of a pair of identical couplings, each comprising a pair of socket members and a disklike connecting web having opposed flat faces, said web extending between said socket members, each web member having a flat face disposed coplanar with the center line or longitudinal center line of its associated socket members, said last mentioned face of one coupling being disposed in contact with the corresponding face of the web of the other coupling, and means for securing the said web members together in various adjusted positions about an axis perpendicular to the plane within which said contacting faces of the web members are disposed.

2. A device as set forth in claim 1 in combination with a socket member mounted on one of said web members and having its center or longitudinal axis in alignment with the said perpendicular axis.

3. A coupling of the class described comprising a central annular web member having flat opposed faces and integral socket members attached to the web member at diametrically opposite positions, each socket opening outwardly and having an annular bore aligned with the bore of the other socket, the web having one of its flat faces coplanar with the axis of the aligned bores in the socket members.

4. In a device of the class described the combination with a coupling comprising a central flat disk-like web member and a pair of socket members disposed at diametrically opposite sides thereof, the socket members having aligned annular bores opening away from said web member, the web member having one of its flat faces disposed coplanar with the axis of said bores in the socket members, of a second coupling comprising a web member and a socket member having an annular bore, the web member having a face offset from the axis of the bore at a distance such that upon mounting of said flat face of the second mentioned coupling on a flat face of the first mentioned coupling, the axes of said bores are all coplanar, and means for securing the said web members together in various adjusted positions about an axis perpendicular to the plane of said bore axes.

ARTHUR E. HOHMEISTER.